United States Patent
Wei et al.

(10) Patent No.: US 11,845,314 B2
(45) Date of Patent: Dec. 19, 2023

(54) SUSPENSION CONTROL METHOD AND SYSTEM, VEHICLE, AND STORAGE MEDIUM

(71) Applicant: NIO TECHNOLOGY (ANHUI) CO., LTD, Hefei (CN)

(72) Inventors: Qiang Wei, Shanghai (CN); Shengwei Deng, Shanghai (CN); Baotian Wang, Shanghai (CN); Da Yuan, Shanghai (CN); Chao Xu, Shanghai (CN); Bohong Xiao, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/859,098

(22) Filed: Jul. 7, 2022

(65) Prior Publication Data
US 2023/0019390 A1  Jan. 19, 2023

(30) Foreign Application Priority Data
Jul. 7, 2021 (CN) .......................... 202110766254.4

(51) Int. Cl.
*B60G 17/0165* (2006.01)

(52) U.S. Cl.
CPC .... *B60G 17/0165* (2013.01); *B60G 2400/204* (2013.01); *B60G 2400/252* (2013.01);
(Continued)

(58) Field of Classification Search
CPC .......... B60G 17/0165; B60G 2400/204; B60G 2400/252; B60G 2400/821;
(Continued)

(56) References Cited

U.S. PATENT DOCUMENTS

| | | | |
|---|---|---|---|
| 2008/0015743 A1* | 1/2008 | Haug ........................ | B60T 7/22 701/1 |
| 2013/0103259 A1* | 4/2013 | Eng .................... | B60G 17/0165 701/37 |

(Continued)

FOREIGN PATENT DOCUMENTS

| | | |
|---|---|---|
| DE | 102019132658 | 12/2020 |
| WO | WO 2020/075455 | 4/2020 |

OTHER PUBLICATIONS

Extended Search Report for European Patent Application No. 22165629.1, dated Aug. 8, 2022, 10 pages.

*Primary Examiner* — Toan C To
(74) *Attorney, Agent, or Firm* — Sheridan Ross P.C.

(57) ABSTRACT

This application relates to a suspension control method and system, a vehicle, and a storage medium. The suspension control method includes: acquiring a pavement image in a traveling direction; identifying a variation type corresponding to a pavement smoothness variation according to the pavement image; generating a control signal according to the identified variation type, to adjust a suspension parameter; detecting, by using a sensor coupled to a suspension, pavement characteristic information corresponding to the variation type; and generating a correction signal based on the pavement characteristic information, to correct the control signal. The suspension control method can identify the pavement smoothness variation more accurately and set the suspension damping parameter according to an identification result.

12 Claims, 5 Drawing Sheets

(52) U.S. Cl.
CPC .... *B60G 2400/821* (2013.01); *B60G 2401/14* (2013.01); *B60G 2500/10* (2013.01); *B60G 2600/68* (2013.01); *B60G 2800/91* (2013.01)

(58) Field of Classification Search
CPC ............ B60G 2401/14; B60G 2500/10; B60G 2600/68; B60G 2800/91
See application file for complete search history.

(56) References Cited

U.S. PATENT DOCUMENTS

| | | | |
|---|---|---|---|
| 2014/0163837 A1* | 6/2014 | Um | B60W 30/143 |
| | | | 701/93 |
| 2014/0303844 A1 | 10/2014 | Hoffman et al. | |
| 2015/0046084 A1* | 2/2015 | Choi | G01C 21/3697 |
| | | | 701/468 |
| 2015/0314663 A1 | 11/2015 | Rhode et al. | |
| 2015/0352920 A1 | 12/2015 | Lakehal-Ayat et al. | |
| 2017/0106855 A1* | 4/2017 | Lavoie | B60W 30/025 |
| 2018/0056745 A1* | 3/2018 | Saylor | B60G 17/0165 |
| 2018/0186210 A1* | 7/2018 | Noll | B60G 17/018 |
| 2019/0344634 A1 | 11/2019 | Kim | |
| 2021/0178845 A1 | 6/2021 | Cho et al. | |
| 2021/0354523 A1* | 11/2021 | Hirao | B60G 17/0152 |

* cited by examiner

SUSPENSION CONTROL METHOD AND SYSTEM, VEHICLE, AND STORAGE MEDIUM

CROSS-REFERENCE TO RELATED APPLICATION

This application claims the benefit of China Patent Application No. 202110766254.4 filed Jul. 7, 2021, the entire contents of which are incorporated herein by reference in its entirety.

TECHNICAL FIELD

This application relates to the field of vehicle control, and in particular, to a suspension control method, a suspension control system, a vehicle, and a computer-readable storage medium.

BACKGROUND ART

At present, there are several methods in the field of vehicle suspension control as follows. One method is to use a front wheel position sensor to monitor in real time amplitude and frequency of vertical bounces of two front wheels and a travel direction of a shock absorber to identify pavement smoothness variations such as speed bumps and potholes, so as to make adjustments to a damping force of the shock absorber according to these signals. However, this method only adjusts the damping force passively and hysteretically, and a suspension system can hardly make quick adjustments in some large shock conditions to relieve large shocks. Another method is to use a visual sensing system to identify pavement smoothness variations such as special speed bumps and potholes in front, so as to make adjustments to the damping force of the shock absorber according to a signal of a visual sensor. However, actual pavements and driving scenarios are complex and diverse, and there may be a risk of a false identification or a failure in identification in this solution, affecting accuracy of suspension control.

SUMMARY OF THE INVENTION

Embodiments of this application provide a suspension control method and system, a vehicle, and a storage medium, so as to identify a pavement smoothness variation more accurately and set a suspension damping parameter according to an identification result, so that the vehicle can pass the pavement smoothness variation with ease.

According to an aspect of this application, a suspension control method is provided, including: acquiring a pavement image in a traveling direction; identifying a variation type corresponding to a pavement smoothness variation according to the pavement image; generating a control signal according to the identified variation type, to adjust a suspension parameter; detecting, by using a sensor coupled to a suspension, pavement characteristic information corresponding to the variation type; and generating a correction signal based on the pavement characteristic information, to correct the control signal.

In some embodiments of this application, optionally, the method further includes: determining a distance between the pavement smoothness variation and an axle according to the pavement image; and determining a sending time of the control signal according to the distance and a vehicle speed.

In some embodiments of this application, optionally, the variation type is constructed to include a speed bump, and the pavement characteristic information includes a width and/or height of the speed bump.

In some embodiments of this application, optionally, the sensor is a vehicle height sensor, and the detecting pavement characteristic information includes: reading a height signal sensed by the sensor; filtering the height signal; calculating a second derivative of the filtered signal; and determining an acceleration signal according to the signal with the second derivative calculated, and determining the pavement characteristic information according to the acceleration signal.

In some embodiments of this application, optionally, the method further includes: adjusting a suspension parameter for a front axle of a vehicle according to the control signal; and adjusting a suspension parameter for a rear axle of the vehicle according to the control signal and the correction signal.

According to another aspect of this application, a suspension control system is provided, including: an image acquisition unit configured to acquire a pavement image in a traveling direction; an image processing unit configured to identify a variation type corresponding to a pavement smoothness variation according to the pavement image; a parameter setting unit configured to generate a control signal according to the identified variation type, to adjust a suspension damping parameter; a characteristic determining unit coupled to the suspension and configured to detect pavement characteristic information corresponding to the variation type; and a parameter correction unit configured to generate a correction signal based on the pavement characteristic information, to correct the control signal.

In some embodiments of this application, optionally, the image processing unit is further configured to determine a distance between the pavement smoothness variation and an axle according to the pavement image; and the parameter setting unit is further configured to determine a sending time of the control signal according to the distance and a vehicle speed.

In some embodiments of this application, optionally, the variation type is constructed to include a speed bump, and the pavement characteristic information includes a width and/or height of the speed bump.

In some embodiments of this application, optionally, the characteristic determining unit includes a vehicle height sensor and is configured to: read a height signal sensed by the vehicle height sensor; filter the height signal; calculate a second derivative of the filtered signal; and determine an acceleration signal according to the signal with the second derivative calculated, and determine the pavement characteristic information according to the acceleration signal.

In some embodiments of this application, optionally, the suspension control system further includes an execution unit, where the execution unit adjusts a suspension parameter of a front axle of a vehicle according to the control signal, and/or adjusts a suspension parameter of a rear axle of the vehicle according to the control signal and the correction signal.

According to another aspect of this application, a suspension control system is provided, including: an image acquisition unit configured to acquire a pavement image in a traveling direction; a characteristic determining unit coupled to the suspension and configured to detect corresponding pavement characteristic information of a variation type corresponding to a pavement smoothness variation; and a processor configured to: identify the variation type corresponding to the pavement smoothness variation according to the pavement image; generate a control signal according to the identified variation type, to adjust a suspension damping parameter; and generate a correction signal based on the pavement characteristic information, to correct the control signal.

According to another aspect of this application, a vehicle is provided, including any one of the suspension control systems described above.

According to another aspect of this application, a computer-readable storage medium is provided, where the computer-readable storage medium stores instructions, and the instructions, when executed by a processor, cause the processor to perform any one of the suspension control methods described above.

BRIEF DESCRIPTION OF THE DRAWINGS

The above and other objectives and advantages of this application will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of this application are mainly described herein with reference to its exemplary embodiments. However, those skilled in the art can easily appreciate that the same principle can be equivalently applied to all types of suspension control methods and systems, vehicles, and storage media, and a same or similar principle can be implemented. These variations do not depart from the true spirit and scope of this application.

A pavement smoothness variation herein refers to a region of a pavement having a significant difference in height relative to the surrounding pavement. In some embodiments of this application, the pavement smoothness variation may present as a speed bump, a bulge, a pavement depression, or the like.

Figure 1:
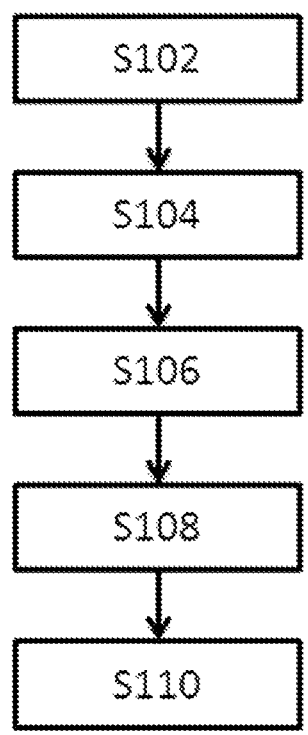
FIG. 1 shows a suspension control method according to an embodiment of this application.

According to an aspect of this application, a suspension control method is provided. As shown in FIG. 1, a suspension control method 10 includes the following steps: in step S102, acquiring a pavement image in a traveling direction; in step S104, identifying a variation type corresponding to a pavement smoothness variation according to the pavement image; in step S106, generating, according to the identified variation type, a control signal for adjusting a suspension damping parameter; in step S108, detecting, by using a sensor coupled to a suspension, pavement characteristic information corresponding to the variation type; and in step S110, generating, based on the pavement characteristic information, a correction signal for correcting the control signal. It can be learned from the foregoing steps that the setting of suspension damping includes two processes: adjustment and correction. Working principles of these two processes will be described in detail below.

In step S102 of the suspension control method 10, the pavement image in the traveling direction is acquired. For example, when a vehicle is traveling on the pavement, a device, such as a camera, disposed in the front of the vehicle may capture the pavement image in front of the vehicle in real time. Depending on hardware configuration, there may be one or more cameras, and the cameras may have different resolution. If a plurality of cameras are used, respective images shot by the cameras may be spliced into the pavement image. The pavement image acquired in step S102 will be used as basic data for image processing.

In step S104 of the suspension control method 10, the variation type corresponding to the pavement smoothness variation is identified according to the pavement image. In step 104, an image recognition technology may be used to determine whether the pavement image includes the pavement smoothness variation, and to identify the type of the pavement smoothness variation when the presence of the pavement smoothness variation is determined. In addition, a position of the pavement smoothness variation relative to the vehicle may also be roughly determined in the presence of when the pavement smoothness variation. In this process, the position of the pavement smoothness variation in the image may be first determined, and then the position of the pavement smoothness variation relative to the vehicle in the image may be determined according to, for example, a position relationship between a pixel in a field of view of the camera and the vehicle.

In some embodiments of this application, the identification process in step S104 specifically includes: pre-processing the pavement image, and processing the pre-processed image by using a neural network to identify the pavement smoothness variation. In some embodiments of this application, the pre-processing may be distortion rectification, image denoising, grayscale processing, boundary extraction, or region of interest extraction. In some examples, distortion rectification may be used to rectify image distortions caused by deviations in manufacturing precision and assembly process. Image denoising can remove noise from an image and prevent the presence of the noise from affecting subsequent determination.

In some examples, the pre-processing may correspond to a subsequent neural network. For example, if the neural network is trained using grayscale images, the pre-processing may be grayscale processing. The pre-processing illustrated above may be implemented in combination. For example, the pre-processing may be grayscale processing and region of interest extraction. In some examples, the above identification process may be implemented by using a convolutional neural network based on deep learning. Before this, a training library of a large quantity of images of speed bumps or potholes may be used to train the neural network, which can improve identification accuracy of an algorithm, thereby improving the identification accuracy of the speed bumps or the potholes (e.g., manhole covers).

Figure 4:
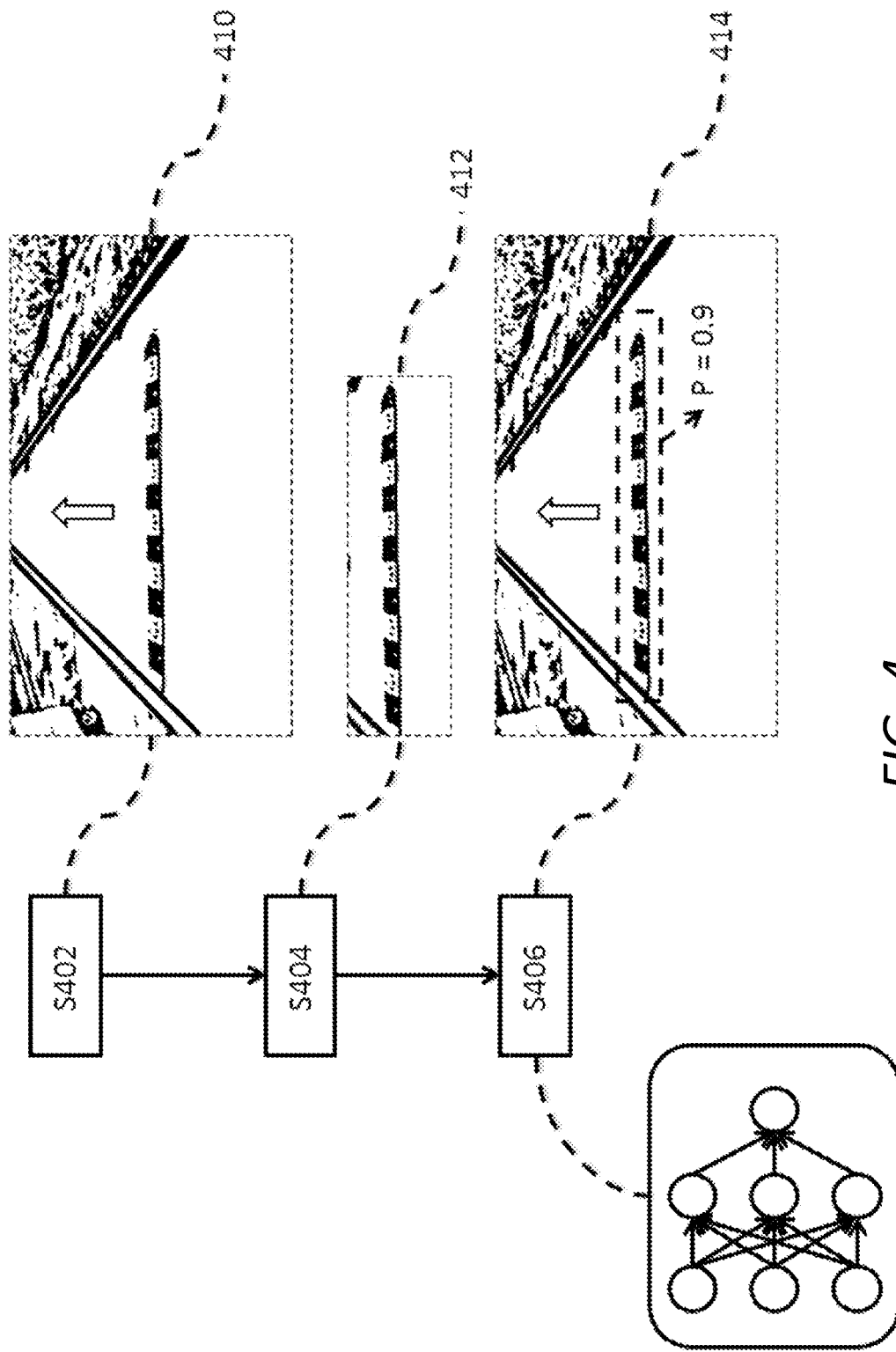
FIG. 4 shows a process of identifying a pavement smoothness variation according to an embodiment of this application.

FIG. 4 schematically shows the process. As shown in the figure, a pavement image 410 may be first acquired in step S402. Second, the acquired image is pre-processed in step 404, and the pre-processing shown in the figure is region of interest extraction, so as to acquire a pre-processed image 412. Then, in step S406, the pre-processed image is processed by using the neural network to identify a type of a pavement smoothness variation. As shown by an image 414 in FIG. 4, the neural network marks a position (dashed box) of the identified pavement smoothness variation (a speed bump) in the pavement image and a confidence level of P=0.9 of the corresponding identification.

In step S106 of the suspension control method 10, the control signal for adjusting the suspension damping parameter is generated according to the identification result. In some examples, when the pavement smoothness variation is identified, a parameter of suspension setting may be changed, so as to change a damping characteristic of the suspension. If no pavement smoothness variation is identified, the parameter of suspension setting may be maintained. For example, when a speed bump is identified, the suspension system may be set to be "soft" during running over the speed bump, so that passengers are not subjected to severe bumps. If no pavement smoothness variation is identified, the original suspension setting "hard" may be maintained, thereby ensuring better support.

In step S108 of the suspension control method 10, the sensor coupled to the suspension is used to detect the pavement characteristic information for the variation type, identified in step S104, of the pavement smoothness variation. The sensor coupled to the suspension may be a vehicle height sensor, an acceleration sensor, or the like. A change in the pavement smoothness may be reflected by a change of a signal from the sensor described above. For example, when wheels run over the speed bump, a spring set of the suspension system will be compressed, resulting in a change in a relative distance. The sensor (e.g., the vehicle height sensor) may detect this change in the relative distance, so that the pavement characteristic information of the pavement smoothness variation can be detected.

In some embodiments of this application, the detection process in step S108 may use an acceleration signal directly sensed by the sensor (e.g., the acceleration sensor) to determine the pavement characteristic information.

Figure 5:
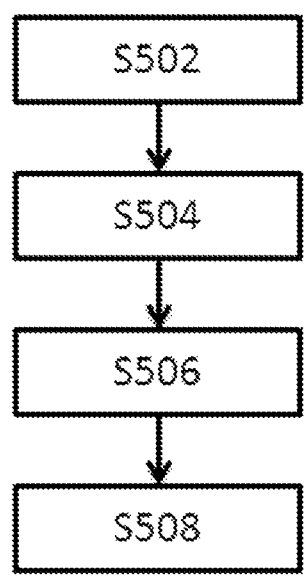
FIG. 5 shows a process of detecting a pavement smoothness variation according to an embodiment of this application.

In some embodiments of this application, the detection process in step S108 may include steps shown in FIG. 5, so that a sensed height signal may be used to obtain the acceleration signal by calculation. In step S502, the signal sensed by the sensor is read. In step S504, the height signal is filtered. In step S506, a second derivative of the filtered signal is calculated. In step S508, the acceleration signal is determined according to the signal with the second derivative calculated, and the pavement characteristic information is determined according to the acceleration signal. For example, vehicle height sensors mounted on a vehicle body and a suspension wheel swing arm may detect vertical bounces of wheels in real time, and then detect, by using the algorithm, whether there is a speed bump/bulge or a pothole. The signal detected by the vehicle height sensor is an initial voltage signal. An acceleration value of the vertical bounces of the wheels may be obtained by calibrating the initial voltage signal using the vehicle height sensor and filtering the initial voltage value, and then calculating a second derivative. Finally, corresponding amplitude and frequency may be detected by using a predetermined algorithm, so as to determine the pavement characteristic information when the wheels run over the speed bump/bulge or the pothole.

In step S110 of the suspension control method 10, the correction signal for correcting the control signal is generated according to the detection result. The signal for adjusting the suspension damping parameter may be generated according to the result of image recognition in step S106 above. However, the result of image recognition sometimes does not always reflect the actual situation. For example, the result of image recognition may be good in terms of type (e.g., speed bumps and potholes). However, sometimes it is difficult to determine specific details of the type, for example, a height of the speed bump, a depth of the pothole, or the like. In this case, the suspension damping parameter may be corrected by using a result of quasi-real-time detection, so that the finally set parameter may be more in line with the actual situation. The suspension system may set, according to the control signal and the correction signal, the damping parameter when the vehicle runs over the smoothness variation, thereby ensuring riding comfort when the vehicle runs over the smoothness variation. For example, when the type of the pavement smoothness variation identified in step S104 is a speed bump, a width and height of the speed bump (the pavement characteristic information) may be further determined by using the sensor in step S108, so that the control signal may be generated and sent according to the type of the pavement smoothness variation, and the correction signal may be generated and sent according to the pavement characteristic information of the pavement smoothness variation, respectively.

In some examples, a suspension parameter of a front axle of the vehicle may be set according to the control signal generated according to the suspension control method 10, and a suspension parameter of a rear axle of the vehicle may be set according to the control signal and the correction signal according to the suspension control method 10. The rear axle of the vehicle may be set according to the parameter of the front axle of the vehicle, or may make adaptive adjustments to the parameter of the front axle. This process is referred to as interaxle preview. The rear axle generally outperforms the front axle because the rear axle has obtained a corrected parameter before the rear axle runs over the pavement smoothness variation.

In some embodiments of this application, in addition to the suspension damping parameter described above, the suspension control method 10 may further determine a sending time of the control signal of the suspension damping parameter through the following steps: determining a distance between the pavement smoothness variation and an axle according to the pavement image; and determining a sending time of the control signal according to the distance and a vehicle speed. The control signal may be sent at the time point, and used to adjust the suspension parameter. In some examples, specifically, the pavement image acquired in step S102 may be first converted into a bird's-eye view. In this step, the pavement image shot by the camera may be converted into a bird's-eye view according to pre-calibration of the camera, because the bird's-eye view is easier to process to obtain distance information.

Second, after the pavement image is converted into the bird's-eye view, a distance s between the pavement smoothness variation and the axle may be determined according to a pre-calibration relationship between a pixel in the bird's-eye view and a distance. For example, in the bird's-eye view, there are 200 pixels between the detected pavement smoothness variation and the front axle, each pixel represents 10 centimeters, and then the pavement smoothness variation is 20 meters away from the front axle. In addition, in some examples, the bird's-eye view may be fused with radar data to determine the distance between the pavement smoothness variation and the axle. For example, an image feature in the bird's-eye view is mapped to a distance feature in the radar data to identify a distance of an object.

Finally, a time $t=s/v$ for adjusting the suspension damping parameter may be determined according to the distance s between the pavement smoothness variation and the axle, and a vehicle speed v. For example, if the distance s between the pavement smoothness variation and the axle is 20 meters, and the vehicle speed v is 10 meters/second, the suspension damping parameter needs to be adjusted to a desired value after $t=2$ seconds (the sending time). According to the setting, an effective time of this parameter may be, for example, 10 milliseconds, then the suspension damping parameter may be adjusted to the desired value during a period of 2 seconds to 2.01 seconds, and after this time period, the suspension may be restored to a set value desired by a suspension control module to restore the support to the vehicle.

In some embodiments of this application, the suspension control method 10 may further generate, according to the identification result in step S104, a signal for adjusting a height of the suspension. Therefore, in addition to adjusting the damping parameter of the suspension, the height of the suspension may be further adjusted, so that the vehicle body may run over the pavement smoothness variation with more ease, preventing bumps from causing a bad driving and riding experience.

Some examples of the suspension control method 10 described above combine the identification of the pavement smoothness variation using, for example, the vehicle height sensor with the identification of the pavement smoothness variation based on the image recognition technology. In some examples, the identification accuracy may be significantly improved through a large quantity of training corrections based on the image recognition technology, so that the identification result may be used as pre-control processing. Due to complexity and variability in actual situations and errors in the training algorithm, the vehicle height sensor is additionally used for pre-control identification correction. In this process, a fusion algorithm may be used so as to achieve a better damping force correction effect.

Figure 2:
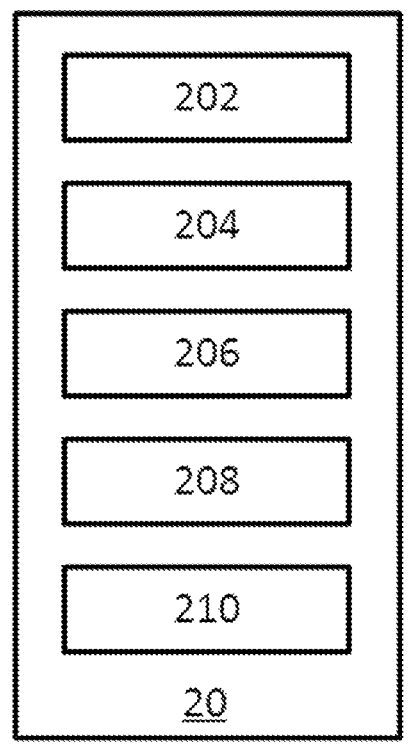
FIG. 2 shows a suspension control system according to an embodiment of this application.

According to another aspect of this application, a suspension control system is provided. As shown in FIG. 2, a suspension control system 20 includes an image acquisition unit 202, an image processing unit 204, a parameter setting unit 206, a characteristic determining unit 208, and a parameter correction unit 210. The parameter setting unit 206 and the parameter correction unit 210 perform the two processes of generating and sending signals for adjusting and correcting the parameter respectively, and the working principles of these two processes will be described in detail below.

The image acquisition unit 202 of the suspension control system 20 is configured to acquire a pavement image in a traveling direction. For example, the image acquisition unit 202 may include a number of cameras. When a vehicle is traveling on the pavement, a camera disposed in the front of the vehicle may capture the pavement image in front of the vehicle in real time. Depending on hardware configuration, there may be one or more cameras, and the cameras may have different resolution. If a plurality of cameras are used, respective images shot by the cameras may be spliced into the pavement image. The pavement image acquired by the image acquisition unit 202 will be used as basic data for image processing.

The image processing unit 204 of the suspension control system 20 is configured to identify a variation type corresponding to a pavement smoothness variation according to the pavement image. The image processing unit 204 may use an image recognition technology to determine whether the pavement image includes the pavement smoothness variation, and to identify the type of the pavement smoothness variation when the presence of the pavement smoothness variation is determined. In addition, a position of the pavement smoothness variation relative to the vehicle may also be roughly determined in the presence of when the pavement smoothness variation. In this process, the position of the pavement smoothness variation in the image may be first determined, and then the position of the pavement smoothness variation relative to the vehicle in the image may be determined according to, for example, a position relationship between a pixel in a field of view of the camera and the vehicle.

In some embodiments of this application, the image processing unit 204 is configured to: pre-process the pavement image, and process the pre-processed image by using the neural network to identify the pavement smoothness variation. In some embodiments of this application, the pre-processing includes at least one of the following: distortion rectification, image denoising, grayscale processing, boundary extraction, or region of interest extraction. In some examples, distortion rectification may be used to rectify image distortions caused by deviations in manufacturing precision and assembly process. Image denoising can remove noise from an image and prevent the presence of the noise from affecting subsequent determination.

In some examples, the pre-processing may correspond to a subsequent neural network. For example, if the neural network is trained using grayscale images, the pre-processing may be grayscale processing. The pre-processing illustrated above may be implemented in combination. For example, the pre-processing may be grayscale processing and region of interest extraction. In some examples, the above identification process may be implemented by using a convolutional neural network based on deep learning. Before this, a training library of a large quantity of images of speed bumps or potholes may be used to train the neural network, which can improve identification accuracy of an algorithm, thereby improving the identification accuracy of the speed bumps or the potholes (e.g., manhole covers). The neural unit described above may be present in a physical form in the image processing unit 204, for example, implemented as a combination of software and hardware.

FIG. 4 schematically shows a process performed by the image processing unit 204. As shown in the figure, a pavement image 410 may be first acquired in step S402. Second, the acquired image is pre-processed in step 404, and the pre-processing shown in the figure is region of interest extraction, so as to acquire a pre-processed image 412. Then, in step S406, the pre-processed image is processed by using the neural network to identify a type of a pavement smoothness variation. As shown by an image 414 in FIG. 4, the neural network marks a position (dashed box) of the identified pavement smoothness variation (a speed bump) in the pavement image and a confidence level of P=0.9 of the corresponding identification.

The parameter setting unit 206 of the suspension control system 20 is configured to generate, according to the identification result, a control signal for adjusting the suspension damping parameter. In some examples, when the pavement smoothness variation is identified, a parameter of suspension setting may be changed, so as to change a damping characteristic of the suspension. If no pavement smoothness variation is identified, the parameter of suspension setting may be maintained. For example, when a speed bump is identified, the suspension system may be set to be "soft" during running over the speed bump, so that passengers are not subjected to severe bumps. If no pavement smoothness variation is identified, the original suspension setting "hard" may be maintained, thereby ensuring better support.

The characteristic determining unit 208 of the suspension control system 20 is coupled to the suspension and is configured to detect pavement characteristic information of the variation type corresponding to the pavement smoothness variation and identified by the image processing unit 204. The pavement characteristic information in the invention refers to a characteristic that can be sensed by a sensor such as the sensor coupled to the suspension when the vehicle runs over the pavement smoothness variation. For example, the pavement characteristic information may include a width or height of a bump, or for example, a width or height of a speed bump. The sensor coupled to the suspension may be a vehicle height sensor, an acceleration sensor, or the like. A change in the pavement smoothness may be reflected by a change of a signal from the sensor described above. For example, when wheels run over the speed bump, a spring set of the suspension system will be compressed, resulting in a change in a relative distance. The sensor (e.g., the vehicle height sensor) may detect this change in the relative distance, so that the pavement characteristic information of the pavement smoothness variation can be detected.

In some embodiments of this application, the detection process of the characteristic determining unit 208 may use an acceleration signal directly sensed by the sensor (e.g., the acceleration sensor) to determine the pavement characteristic information.

In some embodiments of this application, the detection process of the characteristic determining unit 208 may include steps shown in FIG. 5, so that a sensed height signal may be used to obtain the acceleration signal by calculation. In step S502, a signal from a number of vehicle height sensors in the characteristic determining unit 208 is read. In step S504, the height signal is filtered. In step S506, a second derivative of the filtered signal is calculated. In step S508, the acceleration signal is determined according to the signal with the second derivative calculated, and the pavement characteristic information is determined according to the acceleration signal. For example, vehicle height sensors mounted on a vehicle body and a suspension wheel swing arm may detect vertical bounces of wheels in real time, and then detect, by using the algorithm, whether there is a speed bump/bulge or a pothole. The signal detected by the vehicle height sensor is an initial voltage signal. An acceleration value of the vertical bounces of the wheels may be obtained by calibrating the initial voltage signal using the vehicle height sensor and filtering the initial voltage value, and then calculating a second derivative. Finally, corresponding amplitude and frequency may be detected by using a pre-determined algorithm, so as to determine the pavement characteristic information when the wheels run over the speed bump/bulge or the pothole.

The parameter correction unit 210 of the suspension control system 20 is configured to generate, according to the detection result, a correction signal for correcting the control signal. The above parameter setting unit 206 may generate, according to the result of image recognition, the signal for adjusting the suspension damping parameter. However, the result of image recognition sometimes does not always reflect the actual situation. For example, the result of image recognition may be good in terms of type (e.g., speed bumps and potholes). However, sometimes it is difficult to determine specific details of the type, for example, a height of the speed bump, a depth of the pothole, or the like. In this case, the suspension damping parameter may be corrected by using a result of quasi-real-time detection of the characteristic determining unit 208, so that the finally set parameter may be more in line with the actual situation. The suspension system may set, according to the control signal and the correction signal, the damping parameter when the vehicle runs over the smoothness variation, thereby ensuring riding comfort when the vehicle runs over the smoothness variation. For example, when the image processing unit 204 identifies that the type of the pavement smoothness variation is a speed bump, the characteristic determining unit 208 may further determine a width and height of the speed bump (the pavement characteristic information) by using the sensor, so that the control signal may be generated and sent according to the type of the pavement smoothness variation, and the correction signal may be generated and sent according to the pavement characteristic information of the pavement smoothness variation, respectively.

In some examples, the suspension control system 20 further includes an execution unit (not shown in the figure), the execution unit may adjust a suspension parameter of a front axle of a vehicle according to the control signal generated by the suspension control system 20, and the execution unit may further adjust a suspension parameter of a rear axle of the vehicle according to the control signal and the correction signal generated by the suspension control system 20. The rear axle of the vehicle may be set according to the parameter of the front axle of the vehicle, or may make adaptive adjustments to the parameter of the front axle. This process is referred to as interaxle preview. The rear axle generally outperforms the front axle because the rear axle has obtained a corrected parameter before the rear axle runs over the pavement smoothness variation.

In some embodiments of this application, in addition to the suspension damping parameter described above, a sending time of the control signal of the suspension damping parameter may be determine through the following method: determining a distance between the pavement smoothness variation and an axle according to the pavement image; and determining a sending time of the control signal according to the distance and a vehicle speed. The control signal may be sent at the time point, and used to adjust the suspension parameter. In some examples, specifically, the image processing unit 204 first converts the pavement image into the bird's-eye view. In this step, the pavement image shot by the camera may be converted into a bird's-eye view according to pre-calibration of the camera, because the bird's-eye view is easier to process to obtain distance information.

Second, the image processing unit 204 determines a distance s between the pavement smoothness variation and the axle according to a pre-calibration relationship between a pixel in the bird's-eye view and a distance. For example, in the bird's-eye view, there are 200 pixels between the detected pavement smoothness variation and the front axle, each pixel represents 10 centimeters, and then the pavement smoothness variation is 20 meters away from the front axle. In addition, in some examples, the bird's-eye view may be fused with radar data to determine the distance between the pavement smoothness variation and the axle. For example, an image feature in the bird's-eye view is mapped to a distance feature in the radar data to identify a distance of an object.

Finally, the parameter setting unit 206 is further configured to determine a time t=s/v for adjusting the suspension damping parameter, according to the distance s and the vehicle speed v. For example, if the distance s between the pavement smoothness variation and the axle is 20 meters, and the vehicle speed v is 10 meters/second, the suspension damping parameter needs to be adjusted to a desired value after t=2 seconds (the sending time). According to the setting, an effective time of this parameter may be, for example, 10 milliseconds, then the suspension damping parameter may be adjusted to the desired value during a period of 2 seconds to 2.01 seconds, and after this time period, the suspension may be restored to a set value desired by a suspension control module to restore the support to the vehicle.

In some embodiments of this application, the parameter setting unit 206 is further configured to generate, according to the identification result, a signal for adjusting a height of the suspension. Therefore, in addition to adjusting the damping parameter of the suspension, the height of the suspension may be further adjusted, so that the vehicle body may run over the pavement smoothness variation with more ease, preventing bumps from causing a bad driving and riding experience.

Some examples of the suspension control system 20 described above combine the identification of the pavement smoothness variation using, for example, the vehicle height sensor with the identification of the pavement smoothness variation based on the image recognition technology. In some examples, the identification accuracy may be significantly improved through a large quantity of training corrections based on the image recognition technology, so that the identification result may be used as pre-control processing. Due to complexity and variability in actual situations and errors in the training algorithm, the vehicle height sensor is additionally used for pre-control identification correction. In this process, a fusion algorithm may be used so as to achieve a better damping force correction effect.

Figure 3:
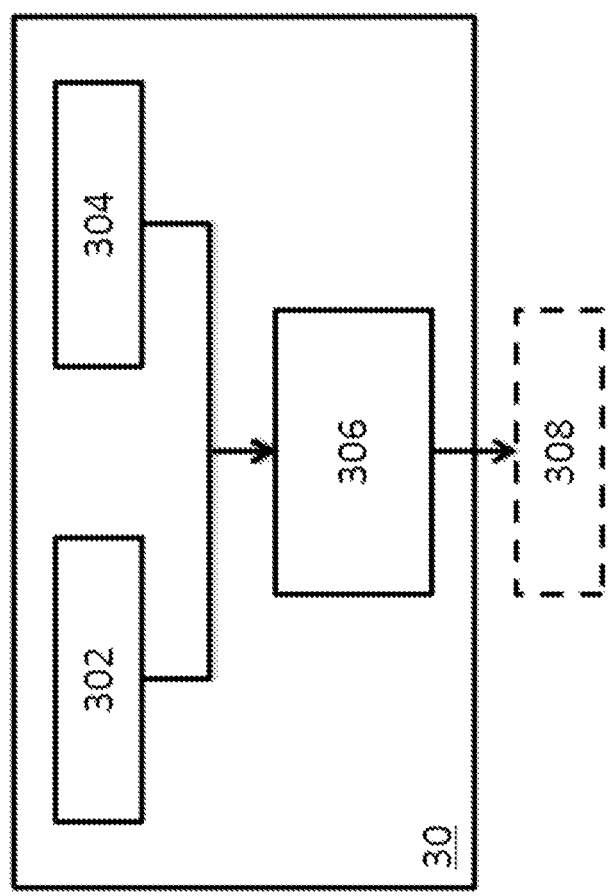
FIG. 3 shows a suspension control system according to an embodiment of this application.

According to another aspect of this application, a suspension control system is provided. As shown in FIG. 3, the suspension control system 30 includes an image acquisition unit 302, a characteristic determining unit 304, and a processor 306. For the purpose of presenting the principle of the invention in its entirety, a suspension system 308 is shown in FIG. 3, and the suspension system 308 is configured to receive a suspension damping parameter finally output by the processor 306 and make adjustments to the suspension accordingly.

The image acquisition unit 302 of the suspension control system 30 is configured to acquire a pavement image in a traveling direction. The image acquisition unit 302 of the suspension control system 30 may be configured in accordance with the image acquisition unit 202 in the suspension control system 20, and the content about the image acquisition unit 202 above is cited herein.

The characteristic determining unit 304 coupled to the suspension of the suspension control system 30 is configured to detect corresponding pavement characteristic information of a variation type corresponding to a pavement smoothness variation. The characteristic determining unit 304 of the suspension control system 30 may be configured in accordance with the characteristic determining unit 208 in the suspension control system 20, and the content about the characteristic determining unit 208 above is cited herein.

The processor 306 of the suspension control system 30 is configured to perform the following operations. First, the processor 306 identifies the variation type corresponding to the pavement smoothness variation according to the pavement image. The processor 306 may use an image recognition technology to determine whether the pavement image includes the pavement smoothness variation, and to identify the type of the pavement smoothness variation when the presence of the pavement smoothness variation is determined. In addition, a position of the pavement smoothness variation relative to the vehicle may also be roughly determined in the presence of when the pavement smoothness variation. In this process, the position of the pavement smoothness variation in the image may be first determined, and then the position of the pavement smoothness variation relative to the vehicle in the image may be determined according to, for example, a position relationship between a pixel in a field of view of the camera and the vehicle.

Second, the processor 306 generates, according to the identification result, a control signal for adjusting the suspension damping parameter. In some examples, when the pavement smoothness variation is identified, a parameter of suspension setting may be changed, so as to change a damping characteristic of the suspension. If no pavement smoothness variation is identified, the parameter of suspension setting may be maintained. For example, when a speed bump is identified, the suspension system may be set to be "soft" during running over the speed bump, so that passengers are not subjected to severe bumps. If no pavement smoothness variation is identified, the original suspension setting "hard" may be maintained, thereby ensuring better support.

Finally, the processor 306 generates, according to the detection result, a correction signal for correcting the control signal. The above result according to image recognition may be used to generate the signal for adjusting the suspension damping parameter. However, the result of image recognition sometime does not always reflect the actual situation. For example, the result of image recognition may be good in terms of type (e.g., speed bumps and potholes). However, sometimes it is difficult to determine specific details of the type, for example, a height of the speed bump, a depth of the pothole, or the like. In this case, the suspension damping parameter may be corrected by using a result of quasi-real-time detection of the characteristic determining unit 304, so that the finally set parameter may be more in line with the actual situation. The suspension system may set, according to the control signal and the correction signal, the damping parameter when the vehicle runs over the smoothness variation, thereby ensuring riding comfort when the vehicle runs over the smoothness variation. For example, when the processor 306 identifies that the type of the pavement smoothness variation is a speed bump, the processor 306 may further determine a width and height of the speed bump (the pavement characteristic information) by using the sensor, so that the control signal may be generated and sent according to the type of the pavement smoothness variation, and the correction signal may be generated and sent according to the pavement characteristic information of the pavement smoothness variation, respectively.

It should be noted that, due to space limitations, optional examples of "identifying the pavement smoothness variation according to the pavement image", "adjusting the suspension damping parameter according to the identification result", and "correcting the suspension damping parameter according to the detection result" in other embodiments above are also cited and will not be repeated herein.

According to another aspect of this application, a vehicle is provided, including any one of the suspension control systems described above. When running over a pavement smoothness variation, the vehicle configured as above can alleviate to a certain degree a bad experience caused by bumps.

According to another aspect of this application, a computer-readable storage medium is provided, in which instructions are stored, and when the instructions are executed by a processor, the processor is caused to perform any one of the suspension control methods described above. The computer-readable medium in this application includes various types of computer storage media, and may be any usable medium accessible to a general-purpose or special-purpose computer. For example, the computer-readable medium may include a RAM, a ROM, an EPROM, an E²PROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used herein, while data is usually copied optically by using lasers in a disc. A combination thereof shall also fall within the scope of protection of the computer-readable media. For example, the storage medium is coupled to a processor, so that the processor can read information from and write information to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing descriptions are merely the embodiments of this application, but are not intended to limit the protection scope of this application. Any feasible variation or replacement conceived by a person skilled in the art within the technical scope disclosed in this application shall fall within the scope of protection of this application. In the case of no conflict, the embodiments of this application and features in the embodiments may also be combined with each another. The scope of protection of this application shall be subject to recitations of the claims.

The invention claimed is:

1. A suspension control method, comprising:
acquiring a pavement image in a traveling direction;
identifying a variation type corresponding to a pavement smoothness variation according to the pavement image;
generating a control signal according to the identified variation type, to adjust a suspension parameter;
detecting, by using a sensor coupled to a suspension, pavement characteristic information corresponding to the variation type; and
generating a correction signal based on the pavement characteristic information, to correct the control signal.

2. The suspension control method according to claim 1, further comprising:
determining a distance between the pavement smoothness variation and an axle according to the pavement image; and
determining a sending time of the control signal according to the distance and a vehicle speed.

3. The suspension control method according to claim 1, wherein the variation type is constructed to comprise a speed bump, and the pavement characteristic information comprises a width and/or height of the speed bump.

4. The suspension control method according to claim 1, wherein the sensor is a vehicle height sensor, and the detecting pavement characteristic information comprises:
reading a height signal sensed by the sensor;
filtering the height signal;
calculating a second derivative of the filtered signal; and
determining an acceleration signal according to the signal with the second derivative calculated, and determining the pavement characteristic information according to the acceleration signal.

5. The suspension control method according to claim 1, further comprising:
adjusting a suspension parameter for a front axle of a vehicle according to the control signal; and
adjusting a suspension parameter for a rear axle of the vehicle according to the control signal and the correction signal.

6. A suspension control system, comprising:
an image acquisition unit configured to acquire a pavement image in a traveling direction; an image processing unit configured to identify a variation type corresponding to a pavement smoothness variation according to the pavement image;
a parameter setting unit configured to generate a control signal according to the identified variation type, to adjust a suspension damping parameter;
a characteristic determining unit coupled to the suspension and configured to detect pavement characteristic information corresponding to the variation type; and
a parameter correction unit configured to generate a correction signal based on the pavement characteristic information, to correct the control signal.

7. The suspension control system according to claim 6, wherein the image processing unit is further configured to determine a distance between the pavement smoothness variation and an axle according to the pavement image; and
the parameter setting unit is further configured to determine a sending time of the control signal according to the distance and a vehicle speed.

8. The suspension control system according to claim 6, wherein the variation type is constructed to comprise a speed bump, and the pavement characteristic information comprises a width and/or height of the speed bump.

9. The suspension control system according to claim 6, wherein the characteristic determining unit comprises a vehicle height sensor and is configured to:
read a height signal sensed by the vehicle height sensor;
filter the height signal;
calculate a second derivative of the filtered signal; and
determine an acceleration signal according to the signal with the second derivative calculated, and determine the pavement characteristic information according to the acceleration signal.

10. The suspension control system according to claim 6, further comprising: an execution unit, wherein the execution unit adjusts a suspension parameter of a front axle of a vehicle according to the control signal, and/or adjusts a suspension parameter of a rear axle of the vehicle according to the control signal and the correction signal.

11. A suspension control system, comprising:
an image acquisition unit configured to acquire a pavement image in a traveling direction;
a characteristic determining unit coupled to the suspension and configured to detect corresponding pavement characteristic information of a variation type corresponding to a pavement smoothness variation; and
a processor configured to:
identify the variation type corresponding to the pavement smoothness variation according to the pavement image;
generate a control signal according to the identified variation type, to adjust a suspension damping parameter; and
generate a correction signal based on the pavement characteristic information, to correct the control signal.

12. A vehicle, comprising the suspension control system according to claim 6.

* * * * *